United States Patent
Lemieux et al.

(10) Patent No.: US 12,480,464 B2
(45) Date of Patent: Nov. 25, 2025

(54) VEHICLE COMPONENT AND METHOD FOR MOLDING A PLASTIC ITEM

(71) Applicant: BOMBARDIER RECREATIONAL PRODUCTS INC., Valcourt (CA)

(72) Inventors: Rene Lemieux, Granby (CA); Guillaume Morin, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 504 days.

(21) Appl. No.: 17/741,002

(22) Filed: May 10, 2022

(65) Prior Publication Data

US 2023/0003181 A1    Jan. 5, 2023

Related U.S. Application Data

(60) Provisional application No. 63/216,982, filed on Jun. 30, 2021.

(51) Int. Cl.
*F02M 35/024*    (2006.01)
*B29C 45/00*    (2006.01)
(Continued)

(52) U.S. Cl.
CPC ..... *F02M 35/0202* (2013.01); *B29C 45/0001* (2013.01); *B29C 45/14688* (2013.01); *F02M 35/02466* (2013.01); *B29K 2023/12* (2013.01); *B29K 2105/206* (2013.01); *B29K 2995/0022* (2013.01); *B29K 2995/0024* (2013.01); *B29L 2031/3032* (2013.01)

(58) Field of Classification Search
CPC ......... F02M 35/0202; F02M 35/02466; B29C 45/0001; B29C 45/14688; B29C 45/372; B29K 2023/12; B29K 2105/206; B29K 2995/0022; B29K 2995/0024; B29L 2031/3032

See application file for complete search history.

(56) References Cited

U.S. PATENT DOCUMENTS 4,519,823 A * 5/1985 Kinney, Jr. ............ B01D 46/10
                                                        55/501
11,092,119 B1 * 8/2021 Kaufman ............... F02M 35/16
(Continued)

OTHER PUBLICATIONS

Precision Woven Synthetic Monofilament Fabrics; SEFAR; pp. 1-16.

*Primary Examiner* — Dung H Bui
(74) *Attorney, Agent, or Firm* — BCF LLP

(57) ABSTRACT

A vehicle component including a component body defining an aperture and including an outer textured surface surrounding the aperture on an exterior side of the component body; and a mesh extending over the aperture, a portion of the mesh being molded into at least a portion of the component surrounding the aperture, a surface of the portion of the mesh abutting the outer textured surface surrounding the aperture. A method includes disposing a mesh in a mold shaped for forming the plastic item, a portion of the mesh being disposed on portions of the mold having a textured surface surrounding at least a part of an aperture defining portion, the mesh being disposed in the mold over the aperture defining portion; and filling the mold with plastic, the mesh being molded in a textured surface of the plastic item formed by the textured surface of the mold.

12 Claims, 9 Drawing Sheets

(51) Int. Cl.
    *B29C 45/14*     (2006.01)
    *F02M 35/02*     (2006.01)
    *B29K 23/00*     (2006.01)
    *B29K 105/20*     (2006.01)
    *B29L 31/30*     (2006.01)

(56) References Cited

U.S. PATENT DOCUMENTS

| | | | | |
|---|---|---|---|---|
| 2005/0169813 | A1* | 8/2005 | D'Amico | A61L 9/042 |
| | | | | 422/124 |
| 2017/0182448 | A1* | 6/2017 | Sudermann | B01D 46/10 |
| 2017/0232820 | A1* | 8/2017 | Mitch | B60H 1/28 |
| | | | | 454/147 |
| 2017/0348624 | A1* | 12/2017 | Do | B01D 46/0005 |
| 2018/0185970 | A1* | 7/2018 | Simmons | B01D 46/0005 |
| 2019/0321764 | A1* | 10/2019 | Louison | F02M 35/02491 |
| 2020/0139285 | A1* | 5/2020 | Menken | B01D 46/0005 |
| 2020/0171923 | A1* | 6/2020 | Williams | B01D 46/10 |
| 2020/0406714 | A1* | 12/2020 | Savard | B60H 1/30 |
| 2021/0298288 | A1* | 9/2021 | Seaton | E04H 15/008 |
| 2021/0316239 | A1* | 10/2021 | Gorrell | B01D 50/20 |
| 2021/0364170 | A1* | 11/2021 | Crawford, III | F24F 3/167 |
| 2022/0065494 | A1* | 3/2022 | Schempp | F24F 8/50 |

\* cited by examiner

VEHICLE COMPONENT AND METHOD FOR MOLDING A PLASTIC ITEM

CROSS-REFERENCE

The present application claims priority to U.S. Provisional Patent Application No. 63/216,982, entitled "Vehicle Component and Method for Molding a Plastic Item," filed Jun. 30, 2021, the entirety of which is incorporated by reference.

FIELD OF TECHNOLOGY

The present technology relates to vehicle components, and more specifically to plastic components with a mesh.

BACKGROUND

In certain molded vehicle components, a mesh is included covering opening or apertures in the component, such as air intake openings in external components on a snowmobile. Snowmobiles and other recreational vehicles often have an integrated mesh covering the air intake to allow entry of air while impeding passage of debris into the internal air passages.

Often, the mesh is molded into the plastic of the component at a certain distance from an upper most surface surrounding the mesh to ensure that the mesh is securely embedded in the molded components, as is illustrated in FIG. 1. The mesh 12 is embedded in the component 10, with a lip 15 formed around the edge of the mesh 12. While the mesh 12 is held securely in place and should not easily rip away from the plastic, the lip 15 surrounding the mesh 12 prevents a user from easily wiping away debris or snow accumulated on the surface of the mesh 12. Small particles of debris or ice could become lodged along the edge of the mesh 12 and against the lip 15.

Thus, there is a desire for a vehicle or plastic components with an improved mesh arrangement.

SUMMARY

It is an object of the present technology to ameliorate at least some of the inconveniences present in the prior art.

According to one aspect of the present technology, there is provided a vehicle component having at least one aperture and a mesh molded over the aperture on a top surface of the component. In the prior art, such as is illustrated in FIG. 1, edges of the mesh are molded below the top surface creating an edge or lip around the mesh. In contrast, according to non-limiting embodiments of the present technology, the component includes a textured surface surrounding the aperture, onto which the mesh is molded. Using a rough, irregular surface texture, a portion of the component material crosses the mesh, affixing the mesh to the surface. This also creates a generally flat surface profile from the mesh to the surrounding components surfaces, eliminating the lip surrounding the mesh. The irregularity of the surface profile surrounding the aperture also aids in camouflaging the edge of the mesh on the component surface.

According to another aspect of the present technology, there is provided a method for molding plastic articles with a mesh disposed over an aperture. In the prior art, as is illustrated in FIG. 2, a mesh 12 would be disposed in a mold 30 having a cavity 36 for receiving material on either side of the edges of the mesh 12, producing the lip or edge 15 surrounding the aperture of the final molded product. In such an arrangement, additional structures or procedures (not illustrated) are generally required to maintain the edges of the mesh 12 in the correct position. In contrast, according to non-limiting embodiments of the present technology, a mesh is disposed onto a mold cavity surface in the mold configured to produce a textured exterior surface on the component. In this way, the mesh is directly positioned in its desired position in the mold cavity.

According to an aspect of the present technology, there is provided a vehicle component including a component body defining an aperture, the component body including an outer textured surface surrounding the aperture on an exterior side of the component body; and a mesh extending over the aperture, a portion of the mesh being molded into at least a portion of the component surrounding the aperture, an outer surface of the portion of the mesh abutting the outer textured surface surrounding the aperture.

In some embodiments, the outer surface of the mesh is generally laterally aligned with the outer textured surface surrounding the aperture.

In some embodiments, an inner surface of the portion of the mesh abuts an inner limit of the outer textured surface surrounding the aperture.

In some embodiments, a surface finish of the outer textured surface is an irregular, bumpy surface finish.

In some embodiments, the surface finish of the outer textured surface is configured to camouflage an edge of the mesh embedded in the outer textured surface.

In some embodiments, the surface finish has a rough, dull appearance.

In some embodiments, the surface finish is a BM-42105 surface finish.

In some embodiments, the component body further comprises surface portions having a glossy surface finish.

In some embodiments, the component body is formed from polypropylene with 10% fiber composition.

In some embodiments, the vehicle component is an air intake conduit; the aperture is an air intake aperture; and the mesh is a hydrophobic mesh.

According to another aspect of the present technology, there is provided a method for molding a plastic item. The method includes disposing a mesh in a mold shaped for forming the plastic item, a portion of the mesh being disposed on portions of the mold having a textured surface, the mold including an aperture defining portion for forming an aperture in the plastic item, the textured surface surrounding at least a part of the aperture defining portion, the mesh being disposed in the mold over the aperture defining portion; and filling the mold with plastic, the mesh being molded to a textured surface of the plastic item formed by the textured surface of the mold.

In some embodiments, disposing the mesh on the textured surface of the mold includes placing the mesh on a textured surface of a cavity of the mold.

In some embodiments, filling the mold with plastic includes injecting the plastic to perform injection molding.

In some embodiments, injecting the plastic includes injection a polypropylene and 10% fiber mix.

According to another aspect of the present technology, there is provided a vehicle component including a component body defining an aperture, the component body including an outer textured surface surrounding the aperture on an exterior side of the component body; and a mesh extending over the aperture, a portion of the mesh being molded to at least a portion of the component surrounding the aperture, at least some of an outer surface of the portion of the mesh being exposed in the outer textured surface surrounding the aperture.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

Figure 3:
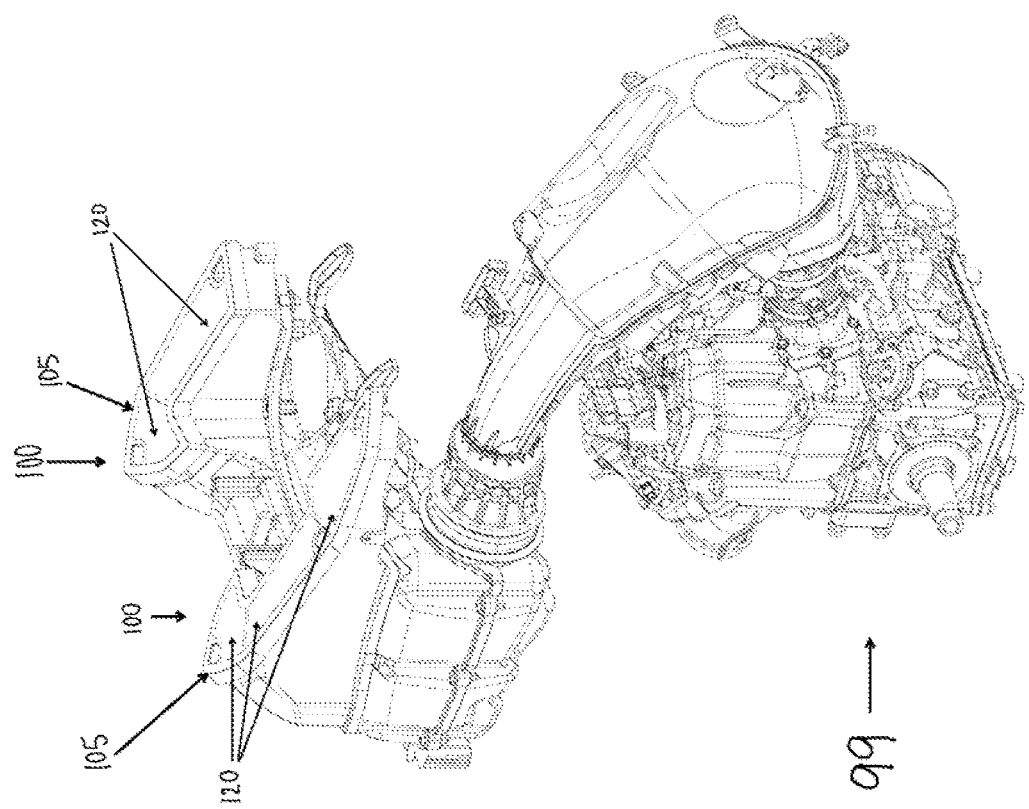
FIG. 3 is a perspective view of air intake vehicle components, an air intake system, and a snowmobile engine, according to non-limiting embodiments of the present technology.
Figure 4:
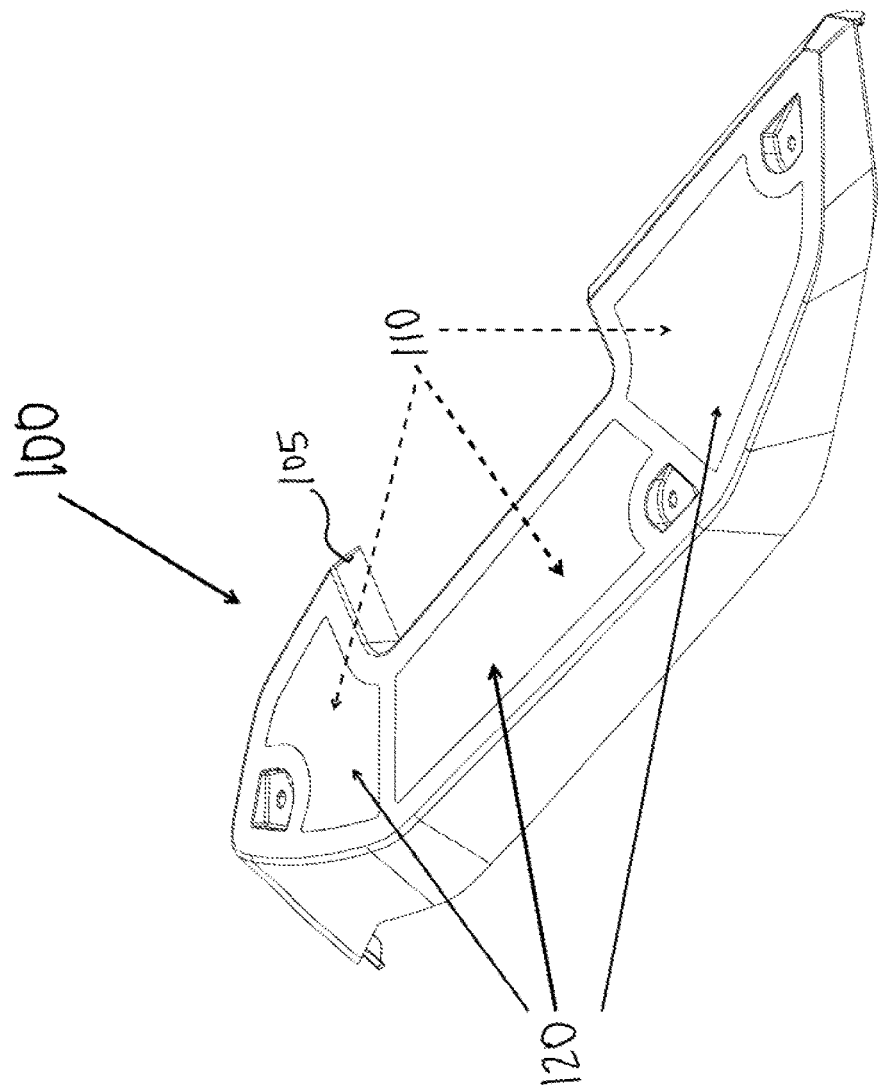
FIG. 4 is a perspective view of the vehicle component of FIG. 3.

A vehicle component 100 in accordance with one non-limiting embodiment of the present technology is shown in FIGS. 3 to 7. The following description relates to one example of a molded component, notably an air intake 100 for a snowmobile engine 99 as is illustrated in FIG. 3. Those of ordinary skill in the art will recognize that there are other known types of vehicle components with mesh covered apertures incorporating different designs and that at least some aspects of the present technology could apply.

The component 100 formed from a molded component body 105. The body 105 is made from polypropylene with 10% fiber composition, but could be formed from different materials, including but not limited to any applicable injection molding material, including for example Nylon.

The component body 105 defines apertures 110 for allowing air passage through the air intake component 100 to the engine 99. For the two components 100 illustrated in FIG. 3, a left component 100 defines three apertures 110 and a right component 100 defines two apertures 110. Depending on the particular embodiment, the component body 105 could define fewer or more apertures 110, including only one aperture 110 in some embodiments.

The component 100 also includes a mesh 120 extending over each aperture 110. In some embodiments, it is also contemplated that one mesh 120 could extend over multiple apertures 110. For the current embodiment of the component 100 as an air intake 100, the mesh 120 covering the apertures 110 is a hydrophobic mesh 120. In the present example embodiment, the mesh 120 is specifically a SEFAR NITEX® mono-filament PA 6.6 (polyamide/nylon) open mesh, with 125 μm mesh openings. Depending on the particular embodiment of the vehicle component 100 and the desired usage (for example, environmental conditions), different types of mesh material could be used for the mesh 120.

The component body 105 includes an outer textured surface 130 surrounding each aperture 110 on an exterior side of the component body 105. As will be described in more detail below, the textured surface 130 is created by mold cavities when injection molding the component 100.

Figure 5:
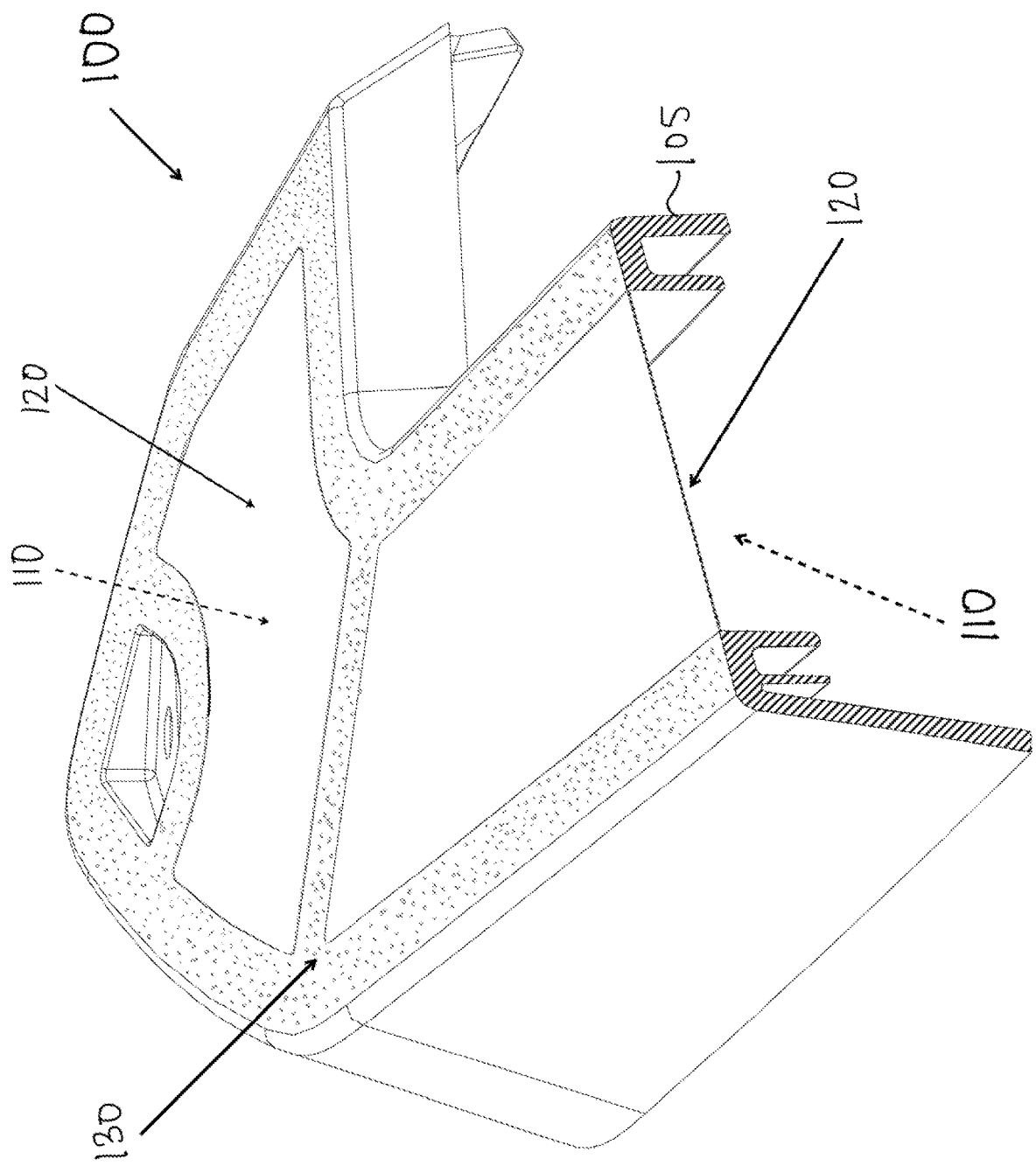
FIG. 5 is a perspective, cross-sectional view of the vehicle component of FIG. 4.

As is illustrated schematically in FIG. 5, a surface finish of the outer textured surface 130 is an irregular, bumpy surface finish. The surface finish of the textured surface 130 thus has a rough, dull appearance. In the present embodiment, the surface finish is specifically a BM-42105 surface finish, as defined by Brasmold (texturing company, St-Jean-Sur-Richelieu, Canada). Remaining exterior portions of the component body 105 include surface portions having a glossy surface finish, although it is contemplated that some or all of the remaining portions may have different surface finishes.

Figure 6:
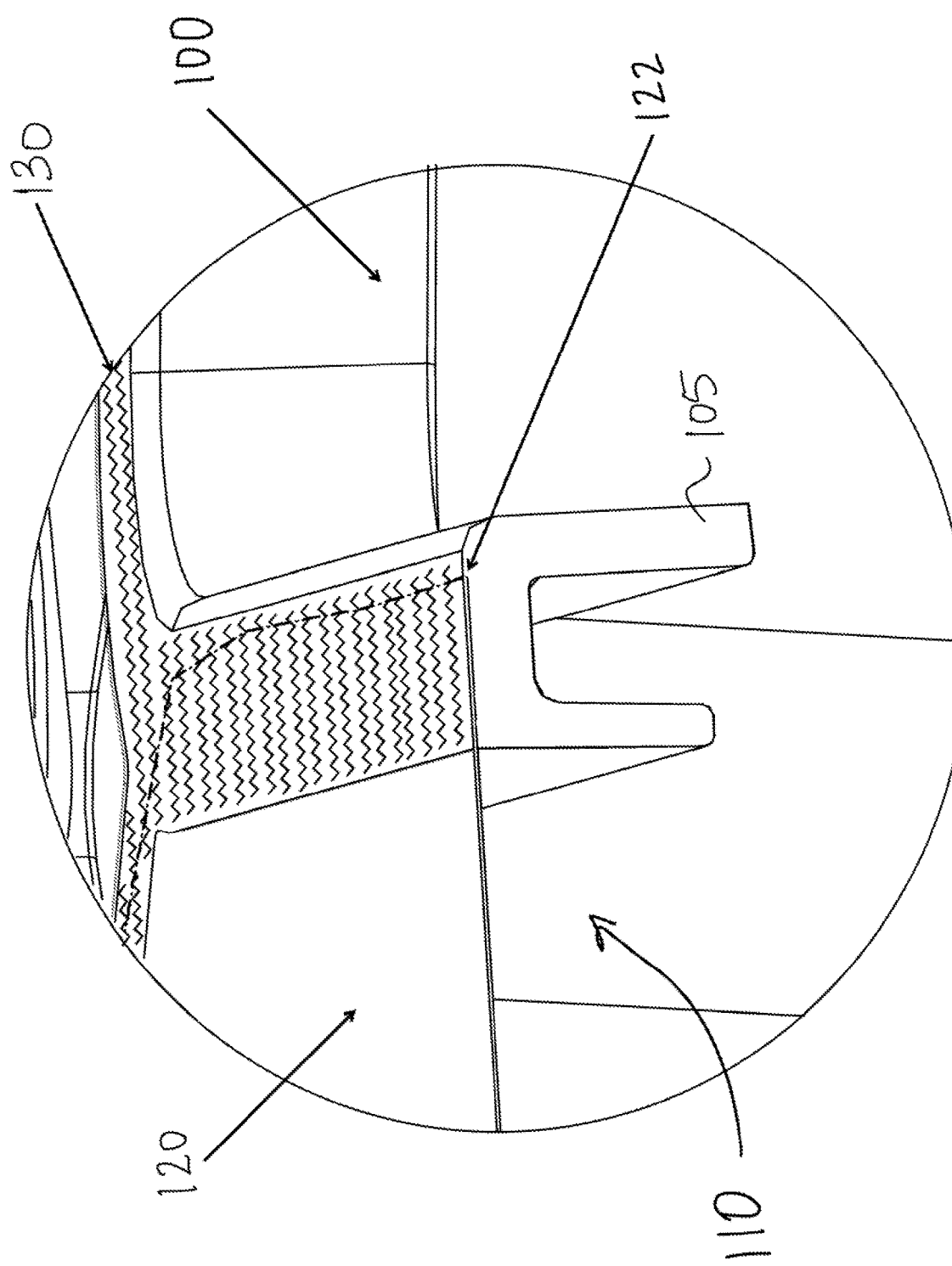
FIG. 6 is a close-up view of the cross-sectional view of the vehicle component of FIG. 5.
Figure 7:
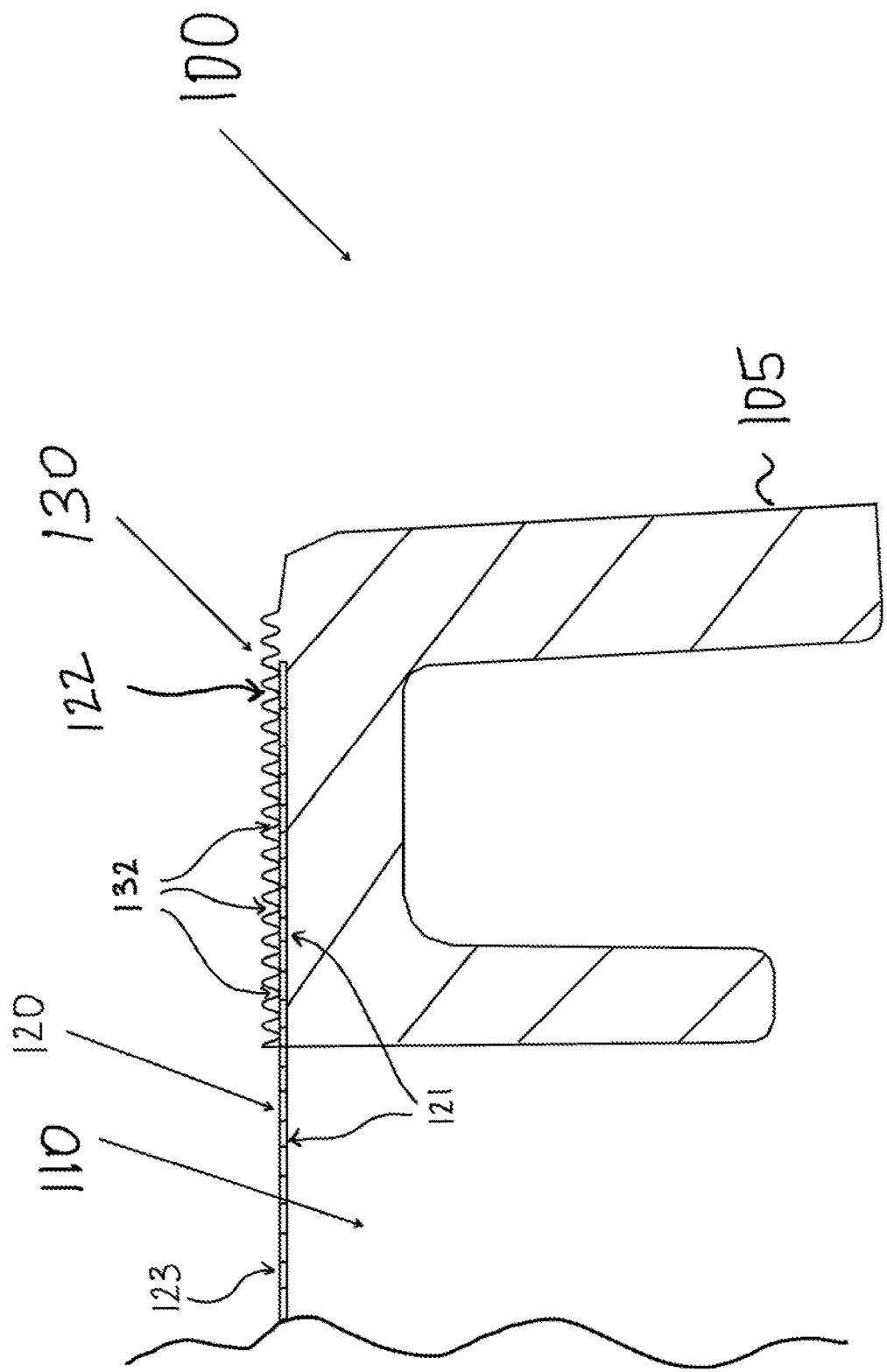
FIG. 7 is a partial, cross-sectional view of the vehicle component of FIG. 4.

As is illustrated in FIGS. 6 and 7, a portion of the mesh 120 is molded into at least a portion of the component body 105 surrounding the aperture 110, specifically to the textured surface 130. Surrounding the aperture 110, an outer surface 123 of the portion of the mesh 120 abuts the outer textured surface 130 surrounding the aperture. The inner surface of the portion of the mesh 120 disposed on the textures surface 130 thus abuts an inner limit of the outer textured surface 130 surrounding the aperture 110. It is contemplated that the mesh 120 could be aligned with the inner limit of the textured surface 130, an outer limit of the textured surface 130, or at some point in between. For example, depending on factors including, but not limited to, the choice of mesh material and an exact form of the textured surface 130, some portions of the mesh 120 could be forced into upper portions of the textured surface 130 during fabrication of the component 100. The surface finish of the outer textured surface 130 is configured to camouflage an edge 122 of the mesh 120 embedded in the outer textured surface 130.

Some of an outer surface 123 of the mesh 120 is exposed in the outer textured surface 130 surrounding the aperture 110, such as the schematically illustrated lower portions 132 of the textured surface 130 shown in FIG. 7. The extent to which the outer surface 123 of the mesh 120 is exposed in the textured surface 130 could depend on various factors, including for example effects on the mesh 120 during fabrication as mentioned above. At only some points in the textured surface 130 does material forming the surface 130 protrude through the mesh 120, thereby securing the mesh 120 in place on the exterior surface of the body 105. With the current embodiment of composition of the component body 105 and the surface texture 130, the overlapping textures of the surface 130 and the mesh 120 are sufficient to maintain the mesh 120 in place on the component body 105 and provide sufficient cover to camouflage the outer edge 122 of the mesh 120.

Figure 1:
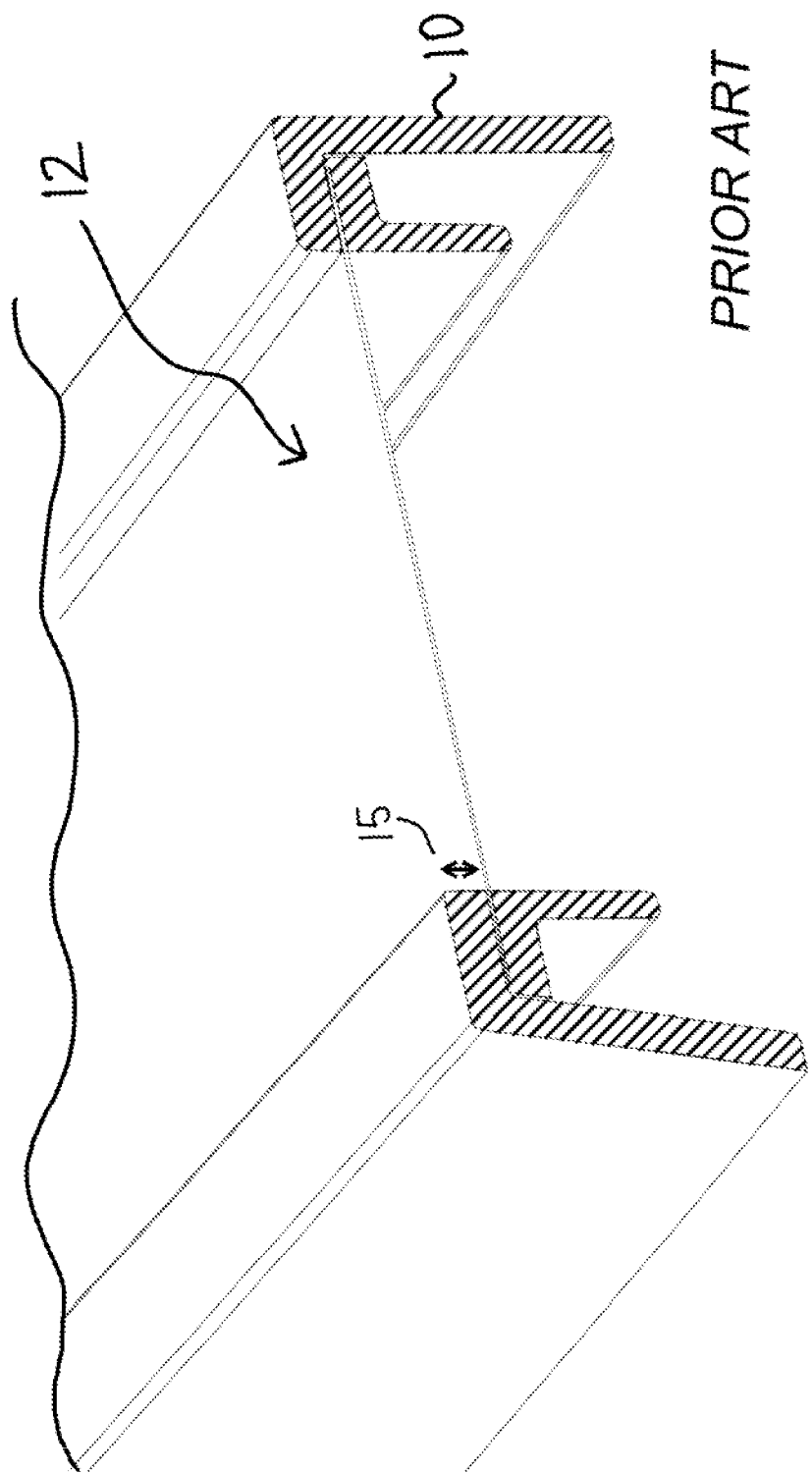
FIG. 1 is a close-up, cross-sectional view of a vehicle component, according to the prior art.
Figure 2:
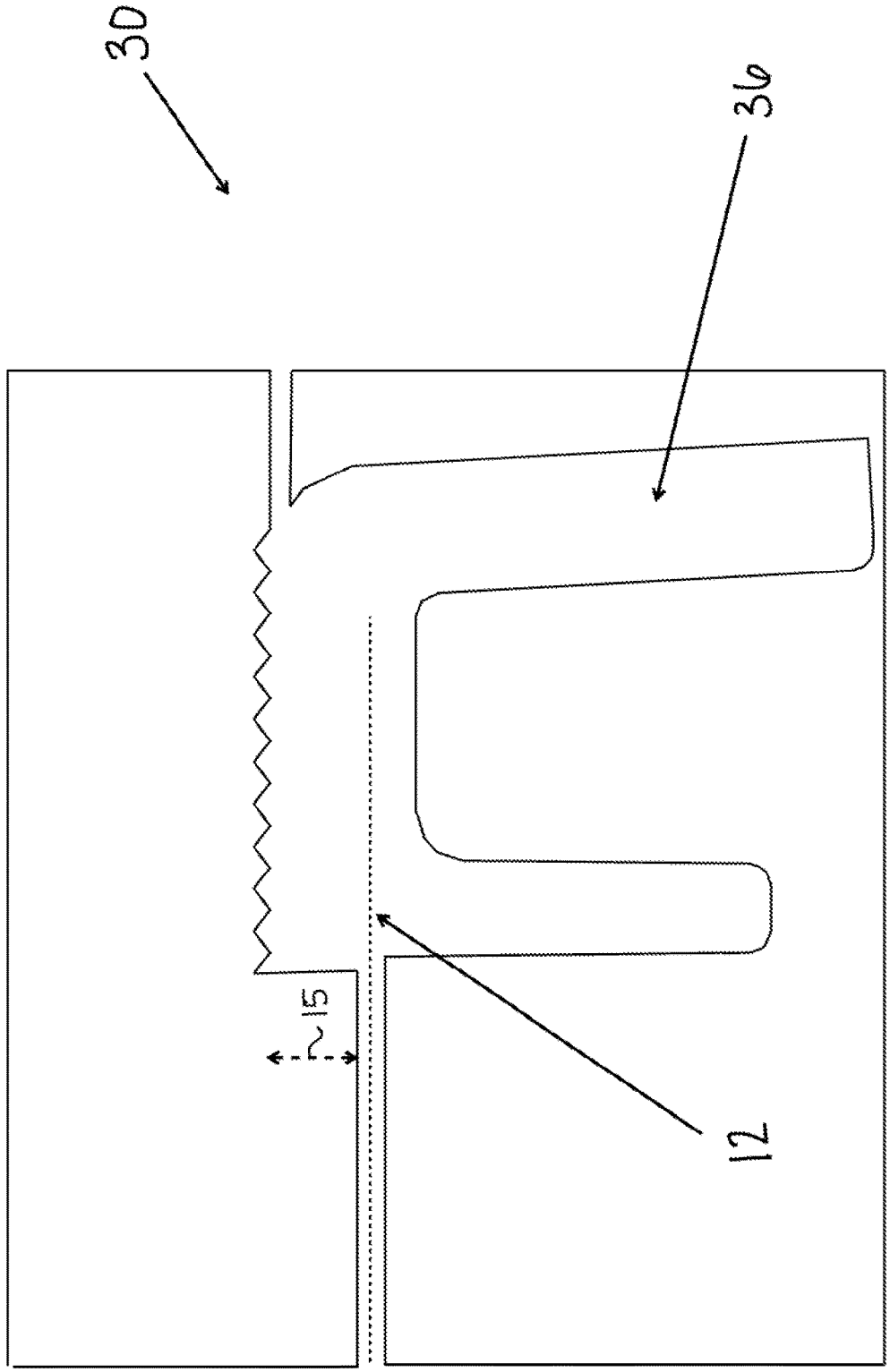
FIG. 2 is a schematic illustration of a mold for the vehicle component of FIG. 1, according to the prior art.

As can further be seen in FIG. 7, the outer surface 123 of the mesh 120 is generally laterally aligned with the outer textured surface 130 surrounding the aperture 110. In contrast to the prior art component 10 illustrated in FIG. 1 where the mesh 12 is sandwiched between relatively thick portions of the component body, according to the present technology the mesh 120 is molded to the exterior surface of the component body 105 such that only a negligible lip of the texture surface 130 is formed around the aperture 110 and the mesh 120. For a user wiping away debris and/or snow, for example, from the mesh 120, there is no edge preventing the debris and/or snow from being cleared away from the mesh 120.

Figure 8:
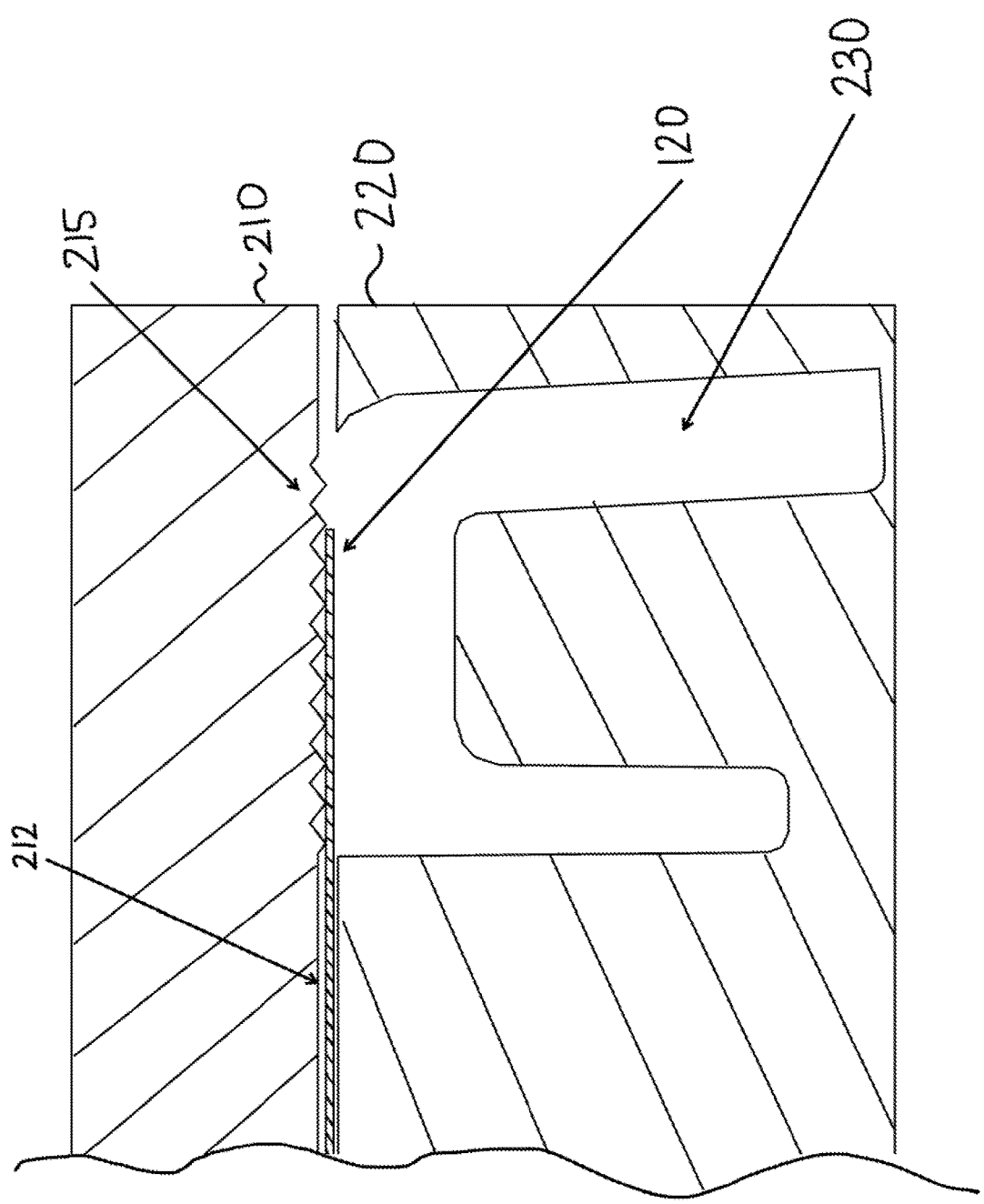
FIG. 8 is a schematic, cross-sectional view of a mold for forming the vehicle component of FIG. 4.
Figure 9:
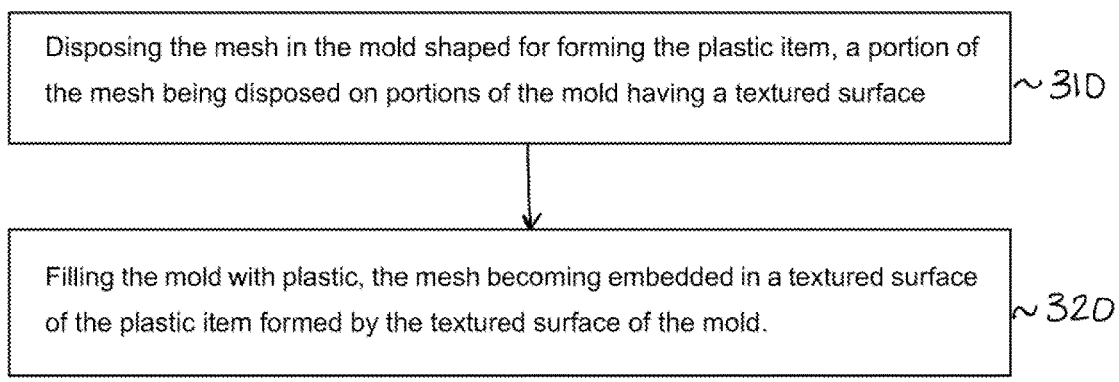
FIG. 9 is a schematic flowchart of a method for forming the vehicle component of FIG. 4.

With reference to FIGS. 8 and 9, a method 300 for molding a plastic item, specifically the components 100, according to non-limiting embodiments of the present technology is illustrated.

The method 300 begins, at step 310, with disposing the mesh 120 in a mold 205 shaped for forming the component 100. The mold 205 in the present non-limiting example includes a mold cavity 210 and a mold core 220. The mold cavity 210 includes a surface-defining portion 215 having a textured surface, which creates the textured surface portion 130 on the finished molded component 100. The mold 205 also includes an aperture defining portion 212 for forming the aperture 110. The surface-defining portion 215 surrounds the aperture defining portion 212.

When placing the mesh 120 in the mold 205, the mesh 120 is disposed over the aperture defining portion 212 and the edge portions 122 of the mesh 120 are disposed on surface-defining portion 215. In contrast to prior art mold 30, no additional spacers or supports are generally required to maintain placement of the edges 122 of the mesh 120, as the edges 122 abut directly the surface-defining portion 215. In at least some embodiments, the mold core 220 could define the surface-defining portion 215 and the mesh 120 could be placed on the mold core 220.

The method 300 continues, at step 320, with filling the mold 205 with plastic, the mesh 120 being molded to the textured surface 130 of the component 100 formed by the surface-defining portion 215 of the mold 205.

In at least some embodiments, filling the mold 205 with plastic includes injecting the plastic to perform injection molding. In at the present embodiment, injecting the plastic includes injection a polypropylene and 10% fiber mix. It is contemplated that different materials could be injected depending on the specific embodiment of the component 100. In some embodiments, some portions of the mesh 120 could be forced into crevices in the surface-defining portion 215 by the injection of plastic into the mold 205. In some such cases, some of the mesh 120 could have an exposed upper surface in the textured surface 130 and/or some portions of the mesh 120 could take on the shape of the surface-defining portion 215.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle component, comprising: a component body defining an aperture, the component body including an outer textured surface surrounding the aperture on an exterior side of the component body; and a mesh extending over the aperture, a portion of the mesh being molded to at least a portion of the component surrounding the aperture, an outer surface of the portion of the mesh abutting being in direct contact with the outer textured surface surrounding the aperture, wherein at least some of the outer surface of the mesh is exposed over the outer textured surface surrounding the aperture.

2. The component of claim 1, wherein the outer surface of the mesh is laterally aligned with the outer textured surface surrounding the aperture.

3. The component of claim 1, wherein an inner surface of the portion of the mesh abuts an inner limit of the outer textured surface surrounding the aperture.

4. The component of claim 1, wherein a surface finish of the outer textured surface is an irregular, bumpy surface finish.

5. The component of claim 4, wherein the surface finish of the outer textured surface is configured to camouflage an edge of the mesh embedded in the outer textured surface.

6. The component of claim 4, wherein the surface finish has a rough, dull appearance.

7. The component of claim 4, wherein the surface finish is a BM-42105 surface finish.

8. The component of claim 4, wherein component body further comprises surface portions having a glossy surface finish.

9. The component of claim 1, wherein the component body is formed from polypropylene with 10% fiber composition.

10. The component of claim 1, wherein:
the vehicle component is an air intake conduit;
the aperture is an air intake aperture; and
the mesh is a hydrophobic mesh.

11. The component of claim 1, wherein at least some of the outer textured surface surrounding the aperture protrudes through the mesh disposed thereon.

12. The component of claim 1, wherein the mesh is aligned with the outer textured surface surrounding the aperture such that only a negligible lip is formed therebetween.

* * * * *